(12) United States Patent
Yoneyama et al.

(10) Patent No.: US 7,334,783 B2
(45) Date of Patent: Feb. 26, 2008

(54) FLUID FILLED VIBRATION DAMPING DEVICE

(75) Inventors: Takeshi Yoneyama, Kasugai (JP); Shouji Akasa, Ichinomiya (JP)

(73) Assignee: Tokai Rubber Industries, Ltd., Komaki (JP)

( * ) Notice: Subject to any disclaimer, the term of this patent is extended or adjusted under 35 U.S.C. 154(b) by 0 days.

(21) Appl. No.: 11/248,575

(22) Filed: Oct. 13, 2005

(65) Prior Publication Data

US 2006/0097435 A1 May 11, 2006

(30) Foreign Application Priority Data

Oct. 18, 2004 (JP) .............................. 2004-303511

(51) Int. Cl.
*F16M 13/00* (2006.01)
(52) U.S. Cl. ................................. 267/140.13; 267/219
(58) Field of Classification Search ............. 267/140.1, 267/140.13, 140.14, 140.15, 219; 248/562, 248/636
See application file for complete search history.

(56) References Cited

U.S. PATENT DOCUMENTS

| | | | | |
|---|---|---|---|---|
| 4,815,720 | A * | 3/1989 | Vanessi ................. | 267/140.13 |
| 4,903,951 | A * | 2/1990 | Miyamoto et al. ..... | 267/140.13 |
| 4,997,169 | A * | 3/1991 | Nakamura et al. ..... | 267/140.13 |
| 5,769,402 | A * | 6/1998 | Ide et al. ................ | 267/140.14 |
| 6,250,616 | B1 | 6/2001 | Suzuki et al. | |
| 6,910,683 | B2 * | 6/2005 | Itoh et al. ............... | 267/140.13 |
| 7,097,168 | B2 * | 8/2006 | Ichikawa et al. ....... | 267/140.13 |
| 2001/0011790 | A1 * | 8/2001 | Satori et al. ........... | 267/140.13 |
| 2004/0084819 | A1 * | 5/2004 | Okada et al. .......... | 267/140.13 |

FOREIGN PATENT DOCUMENTS

| | | |
|---|---|---|
| JP | A-64-049731 | 2/1989 |
| JP | A 2-26336 | 1/1990 |
| JP | A-2000-193015 | 7/2000 |
| JP | A 2002-206587 | 7/2002 |
| JP | A-2003-074617 | 3/2003 |
| JP | A-2003-139189 | 5/2003 |
| JP | A-2003-294079 | 10/2003 |

* cited by examiner

*Primary Examiner*—Robert A. Siconolfi
*Assistant Examiner*—James K. Hsiao
(74) *Attorney, Agent, or Firm*—Oliff & Berridge, PLC

(57) ABSTRACT

A fluid filled vibration damping device including: a low-frequency orifice passage opening directly towards a pressure-receiving chamber and an equilibrium chamber at either axial end surface of a first orifice member; a rubber partition plate disposed between a bottom surface of a center concavity of the first orifice member and a bottom end surface of a second orifice member, to create a seal mechanism that grasps an outer perimeter edge and a center diameter section of the rubber partition plate with a fluid-tight seal therebetween. Semicircular sections of the rubber partition plate surrounded by the areas grasped by the seal mechanism constituting a first deformable membrane section and a second deformable membrane section that respectively allow prescribed amounts of elastic deformation.

11 Claims, 4 Drawing Sheets

FLUID FILLED VIBRATION DAMPING DEVICE

INCORPORATED BY REFERENCE

The disclosure of Japanese Patent Application No. 2004-303511 filed on Oct. 18, 2004 including the specification, drawings and abstract is incorporated herein by reference in its entirety.

BACKGROUND OF THE INVENTION

1. Field of the Invention

The present invention relates to a fluid filled vibration damping device that produces damping action by means of the damping characteristics exhibited by flow action of a non-compressible fluid sealed therein, such as a fluid filled vibration damping device used for an automobile engine mount, body mount, or differential mount.

2. Description of the Related Art

Fluid filled vibration damping devices are known as one type of damping device, such as a damping support unit or a damping connecting unit, for mounting between the component members of a vibration transmission system. This damping device has a construction wherein, as shown in JP-A-2002-206587 for example, a first mounting member is connected by a rubber elastic body to a cylindrical second mounting member that is disposed with a gap between it and the first mounting member; and a pressure-receiving chamber, part of the wall of which is comprised by the rubber elastic body, and an equilibrium chamber, part of the wall of which is comprised of an easily deformable flexible layer and in which a non-compressible fluid is enclosed, are respectively formed to either side of a partition member supported by the second mounting member, with these two chambers interconnected by an orifice passage. In this damping device, because damping action that would be difficult to obtain from the vibration-reducing effect or vibration-insulating effect of a rubber elastic body is here easily obtained based on the flow action of fluid, such as the resonance effect of the fluid flowing in the orifice passage, the application of such a damping device to an automobile engine mount or body mount has been contemplated.

Incidentally, in a damping device applied to an automobile engine mount or the like, because the frequency range of the vibration to be damped varies according to the vehicle driving conditions and the like, the device must provide a superior damping action with respect to multiple vibration frequencies falling over a wide range. For example, in the case of an automobile engine mount, in general, the device must provide damping action with respect to not only low-frequency vibration of around 10 Hz encountered with engine shake and middle-frequency vibration in the 15-30 Hz range that occur during engine idling or the like, but also to high-frequency vibration in the 80-120 Hz range, such as rumble during driving.

Accordingly, a fluid filled vibration damping device for accommodating this need is also described in JP-A-2-26336. In this damping device, a low-frequency orifice passage tuned to the low frequency range characteristic of engine shake and the like, a middle-frequency orifice passage tuned to the middle-frequency range characteristic of engine idling vibration and the like, and a high-frequency orifice passage tuned to the high-frequency range of driving noise and the like are disposed in a partition member, and deformable plates tuned to the frequency band of the associated orifice passage are disposed in the middle-frequency orifice passage and the high-frequency orifice passage.

In this type of damping device, when vibration in the low-frequency range is input, since the amount of flow in the middle-frequency and high-frequency orifice passages is restricted by the deformable plate while the amount of flow in the low-frequency orifice passage is secured, damping action is obtained based on the flow action of the fluid flowing in the low-frequency orifice passage. Furthermore, when vibration in the middle-frequency band is input, the low-frequency orifice passage becomes essentially clogged, but is prevented from acting as a high-powered spring by the flow action of the fluid flowing in the middle-frequency orifice passage or the fluid absorption effect attributable to the displacement or deformation of the deformable plate disposed therein, thereby giving rise to damping action.

However, in the fluid filled vibration damping device described in JP-A-2-26336, multiple deformable plates having mutually different tuning are prepared, and these plates are separately disposed in the fluid flow paths of the middle-frequency orifice passage and the high-frequency orifice passage. This increases the number of component parts and makes the device more complex and difficult to manufacture and assemble, thereby reducing manufacturing efficiency and increasing the cost of manufacture.

Furthermore, since the multiple, essentially round deformable plates are disposed side by side on essentially the same surface of the partition member, it is difficult to obtain a sufficient total effective surface area for the deformable plates on the partition member. Consequently, if sufficient total effective surface area for the deformable plates is to be obtained, the partition member, and therefore the damping device, must inevitably be increased in size.

Moreover, during assembly of the multiple deformable plates into the partition member, since it is difficult to determine the precise type of each deformable plate simply from observing its external appearance, there is a danger that one or more of the deformable plates may be erroneously assembled into the incorrect orifice passage.

SUMMARY OF THE INVENTION

It is therefore an object of the present invention to provide a fluid filled vibration damping device having novel construction that functions effectively with respect to multiple types of vibration over a wide frequency range, is relatively simple, and can be manufactured easily and at low cost.

The above and/or optional objects of this invention may be attained according to at least one of the following modes of the invention. The following modes and/or elements employed in each mode of the invention may be adopted at any possible optional combinations. It is to be understood that the principle of the invention is not limited to these modes of the invention and combinations of the technical features, but may otherwise be recognized based on the teachings of the present invention disclosed in the entire specification and drawings or that may be recognized by those skilled in the art in the light of the present disclosure in its entirety.

According to a first mode of the present invention provides a fluid filled vibration damping device comprising: a first mounting member attachable to one of two members coupled together in a vibration damping manner: a second mounting member attachable to an other of the two members and having a cylindrical portion one opening of which is axially opposed to the first mounting member with a gap therebetween; a rubber elastic body elastically connecting the first and second mounting members so that the rubber elastic body closes off the one opening of the cylindrical portion of the second mounting member with a fluid-tight seal; a flexible layer closing off an other opening of the cylindrical portion with a fluid-tight seal; a partition member disposed within and rigidly supported by the cylindrical portion so that a pressure-receiving chamber partially defined by the rubber elastic body is formed on one side of the partition member, and an equilibrium chamber partially defined by the flexible layer is formed on an other side of the partition member; and a low-frequency orifice passage interconnecting the pressure-receiving chamber and the equilibrium chamber, wherein the partition member includes: a first orifice member disposed in a space between the rubber elastic body and the flexible layer with rigidly supported by the cylindrical portion of the second mounting member at an outer edge thereof, and having a center concavity that opens toward the pressure-receiving chamber; and a second orifice member securely fitted into the center concavity of the first orifice member, wherein the low-frequency orifice passage is formed so as to run circumferentially around an outer circumferential surface of the first orifice member; and ends of the low-frequency orifice passage open directly towards the pressure-receiving chamber and the equilibrium chamber at either axial end surface of the first orifice member, wherein a rubber partition plate is disposed between a bottom wall of the center concavity of the first orifice member and a bottom end surface of the second orifice member, to create a seal mechanism that grasps an outer perimeter edge and a center diameter section of the rubber partition plate with a fluid-tight seal between the bottom surface of the first orifice member and the bottom end surface of the second orifice member, wherein semicircular sections of the rubber partition plate surrounded by the areas grasped by the seal mechanism constitute a first deformable membrane section and a second deformable membrane section that respectively allow prescribed amounts of elastic deformation along a direction of thickness of the rubber partition plate, such that the first deformable membrane section comprises the first flow restricting assembly disposed in a fluid flow path in the middle-frequency orifice passage and the second deformable membrane section comprises a second flow restricting assembly disposed in a fluid flow path in the high-frequency orifice passage; and wherein a first through-hole that links the first deformable membrane section to the equilibrium chamber and a second through-hole that links the second deformable membrane section to the equilibrium chamber are formed in the first orifice member, and a first through-passage that links the first deformable membrane section to the pressure-receiving chamber and a second through-passage that links the second deformable membrane section to the pressure-receiving chamber are formed in the second orifice member, such that the first through-passage constitutes a middle-frequency orifice passage tuned to a higher range of vibration than the low-frequency orifice passage and the second through-passage constitutes a high-frequency orifice passage tuned to a higher range of vibration than the middle-frequency orifice passage.

In the fluid filled vibration damping device having the construction described above, by restricting the flow of fluid flowing through the middle-frequency orifice passage and the high-frequency orifice passage using the first and second deformable membrane sections formed from a single rubber partition plate, damping action against low-, middle- and high-frequency vibration can be effectively created through the flow action of the fluid traveling through the low-, middle- and high-frequency orifice passages, respectively.

Accordingly, in this mode of the invention, the first deformable membrane section disposed in the fluid flow path of the middle-frequency orifice passage and the second deformable membrane section disposed in the flow path of the high-frequency orifice passage are formed from a single rubber partition plate disposed between the first orifice member and the second orifice member; and the low-frequency orifice passage is formed at the outer perimeter area of the first orifice member. In other words, the low-, middle- and high-frequency orifice passages are formed from a single rubber partition plate. As a result, an increase in the number of component parts is avoided, construction is simpler, and the cost and difficulty of manufacture are minimized. Furthermore, forming the first and second deformable membrane sections from a single unit makes them easier to assemble and reliably prevents assembly errors such as assembly of the first and second deformable membrane sections in the wrong orifice passages. Moreover, respectively forming the first and second deformable membrane sections in the essentially semicircular sections of the rubber partition plate provides the advantage of efficiently assuring effective surface areas for the first and second deformable membrane sections, while avoiding an increase in the device size as a whole.

In addition, the first and second deformable membrane sections are held in a fluid-tight fashion in the flow path of the middle- and high-frequency orifice passages respectively due to the rigid interlocking construction of the first and second orifice members and the elasticity of the rubber partition plate. Consequently, first and second flow restricting assembly having a high degree of fluid-tightness can be easily realized. Furthermore, forming the low-frequency orifice passage at the outer perimeter area of the first orifice member and having it directly link the pressure-receiving chamber to the equilibrium chamber avoids pressure leakage from a gap, space, or the like between component parts. Therefore, the relative pressure fluctuations between the pressure-receiving chamber and the equilibrium chamber are effectively brought about, and a good damping action (orifice effect) is obtained based on fluid motion, such as from the resonance action of the fluid that flows through each orifice passage.

Therefore, the fluid filled vibration damping device according to this mode is capable of exhibiting in a stable fashion damping action of the three orifice passages effectively at three different tuning frequencies, for multiple, widely varying frequency bands. Furthermore, because the damping device providing this effect is realized using a small number of component parts and a simple construction, erroneous assembly can be avoided and the device can be manufactured easily and at a relatively low cost.

A second mode of the present invention provides a fluid filled vibration damping device according to the aforementioned first mode, wherein a recess that opens toward the pressure-receiving chamber is formed in the second orifice member so that the pressure-receiving chamber is partially defined by the concavity, and the second through-passage is formed to pass through a bottom wall of the recess.

In this mode, the recess enables the pressure-receiving chamber to have a large volume. Moreover, not only is the degree of freedom in tuning the middle-frequency orifice passage made sufficiently large by increasing the thickness allowance of the second orifice member, but in addition, the degree of freedom in tuning the high-frequency orifice passage can also be maintained at a high level by adjusting the depth of the concavity.

A third mode of the present invention provides a fluid-filled vibration damping device according to the aforementioned first or second mode, wherein an extension protrusion that protrudes toward the pressure-receiving chamber is integrally formed in the second orifice member, and the first through-passage is formed so as to axially pass through an area in which the extension protrusion is formed.

In this mode, the effective length of the middle-frequency orifice passage can be increased without increasing the thickness of the partition member or the second mounting member. Consequently, the degree of freedom in tuning can be further increased and damping performance further enhanced while keeping the device small and compact.

A fourth mode of the present invention provides a fluid filled vibration damping device according to any one of the aforementioned first through third modes, further comprising a positioning mechanism disposed between the first and second orifice members for fixing the relative positions of the first and second orifice members in a circumferential direction by preventing the relative axial rotation thereof.

In this mode, the relative positions of the first and second orifice members can be easily fixed during assembly, the seal mechanism jointly realized by these members can be achieved in a stable fashion, and the first and second deformable membrane sections can be formed in a stable fashion as well.

A fifth mode of the present invention provides a fluid filled vibration damping device according to any one of the first through fourth modes, wherein protrusions that protrude toward the center diameter section of the rubber partition plate are integrally formed with the bottom surface of the first orifice member and the bottom end surface of the second orifice member, respectively; and the seal mechanism includes a grasping mechanism that uses these protrusions to grasp this center diameter section.

In this mode, shunting between the middle-frequency orifice passage and the high-frequency orifice passage can be effectively prevented by pressing the protrusions against the deformable rubber plate. Furthermore, since it is no longer necessary to form a protrusion or other seal unit that extends in a specific direction on the deformable rubber plate, by forming the deformable rubber plate with a configuration having no particular circumferential orientation, there is no need to consider a particular circumferential orientation when assembling the deformable rubber plate on the first and second orifice members, thereby making manufacturing even easier.

A sixth mode of the present invention provides a fluid filled vibration damping device according to any one of the first through fifth modes, wherein the rubber partition plate includes an annular seal unit integrally formed at an outer rim thereof so as to protrude toward either side thereof, and so as to run continuously around a circumference thereof, and wherein the seal mechanism includes a grasping mechanism that grasps the seal unit in the direction of the thickness of the rubber partition plate via the bottom surface of the first orifice member and the bottom end surface of the second orifice member, and stepped locking surfaces that engage with an inner circumferential surface of the annular seal unit to prevent the displacement thereof toward an inner circumferential side thereof are respectively formed on the bottom surface of the first orifice member and the bottom end surface of the second orifice member.

In this mode, a large effective dimension can be ensured in the grasping direction at the outer edge of the rubber partition plate where particularly high-performance sealing capability is needed, thus enabling a stable long-term sealing performance. Furthermore, through the locking action of the annular seal member with the locking surfaces, the rubber partition can be positioned with high accuracy during assembly, subsequent displacement can be prevented, and the proper operations of the first and second deformable membrane sections comprising the rubber partition can be ensured in a stable manner.

A seventh mode of the present invention according to any one of the first through sixth mode, wherein the second orifice member includes a rigidity adjustment member; and a rigidity of the second deformable membrane section is increased to a degree higher than that of the first deformable membrane section.

In this mode, the settings regarding the characteristic frequencies of the first and second deformable membrane sections can be easily changed and the degree of freedom in tuning to obtain the damping effect can be further increased. The rigidity adjustment member may be realized by changing the size, thickness, material and the like of the first and second deformable membrane sections, for example. Alternatively, a reinforcing member made of a separate material may be affixed to the first or second deformable membrane section. Alternatively, the rigidity adjustment member may comprise a restricting member such as the reinforcing bar described in connection with the eighth mode below that restricts the degree of elastic deformation of part of the first or second membrane section.

An eighth mode of the present invention according to the aforementioned seventh mode, wherein the second through-hole includes at a circumferential center thereof a reinforcing bar that traverses the second through-hole so that the rigidity adjustment member is achieved by restricting the elastic deformation of the second deformable membrane section via contact with this reinforcing bar.

In this mode, by partially restricting the amount of elastic deformation at the center part of the second deformable membrane section via contact with the reinforcing bar, the effective free length during elastic deformation of the second deformable membrane section is reduced, and its spring hardness is increased to a level higher than that of the first deformable membrane section. As a result, even if the first and second deformable membrane sections have the same configuration, thickness and material, they may be given different and unique elastic deformation frequencies.

A ninth mode of the present invention according to the aforementioned first through eighth modes, wherein the second orifice member includes a flange that extends in an axis-perpendicular direction thereof, and when the second orifice member engages the center concavity of the first orifice member, a engaging end of the second orifice member in an axial direction relative to the first orifice member is regulated by engagement of the flange with the edge of the opening of the center concavity.

In this mode, the grasping pressure to be exerted by the first and second orifice members in the direction of the thickness of the rubber partition plate can be obtained in a stable fashion, and a more stable deformation characteristic and fluid-tight seal characteristic may be obtained in connection with the first and second deformable membrane sections.

A tenth mode of the present invention according to the aforementioned first through ninth modes, wherein a natural frequency of the first deformable membrane section is tuned to a vibration frequency range to be damped, which is higher than a resonance frequency of the fluid flowing through the low-frequency orifice passage, and a natural frequency of the second deformable membrane section is tuned to a vibration frequency range to be damped that is higher than a resonance frequency of the fluid flowing through the middle-frequency orifice passage.

In this mode, when a middle- or high-frequency vibration to be damped is input, each deformable membrane section displaces or deforms more efficiently based on the resonance effect, and consequently a high-powered spring effect in the pressure-receiving chamber is even more effectively prevented, and damping performance based on the orifice effect is further improved.

An eleventh mode of the present invention provides an automobile engine mount utilizing the fluid filled vibration damping device according to any one of the aforementioned first through tenth modes of the present invention, characterised in that by mounting either the first or the second mounting member to an automobile power unit and mounting an other mounting member to the automobile body, the power unit is supported on the body in a vibration-damping manner, the resonance frequency of the fluid flowing through the low-frequency orifice passage is tuned to a low vibration frequency range typical of engine shake or the like, the resonance frequency of the fluid flowing through the middle-frequency orifice passage is tuned to a middle vibration frequency range characteristic of engine idling or the like, and the resonance frequency of the fluid flowing through the high-frequency orifice passage is tuned to a high vibration frequency range characteristic of driving rumble or the like.

In the automobile engine mount having the above construction, by ensuring a good damping action against the low vibration frequencies typical of engine shake or the like, the middle vibration frequencies typical of engine idling or the like, and the high vibration frequencies characteristic of the booming noises of driving or the like, a useful and practical mounting is obtained.

As will be apparent from the above description, in the fluid filled vibration damping device constructed according to the present invention, because low-, middle- and high-frequency orifice passages corresponding to the frequencies of the vibrations to be damped are formed by placing a single rubber partition plate between the first and second orifice members, a high-performance damping device that can be manufactured easily and at relatively low cost may be effectively realized.

BRIEF DESCRIPTION OF THE DRAWINGS

The forgoing and/or other objects features and advantages of the invention will become more apparent from the following description of a preferred embodiment with reference to the accompanying drawings in which like reference numerals designate like elements and wherein.

DETAILED DESCRIPTION OF PREFERRED EMBODIMENTS

Figure 1:
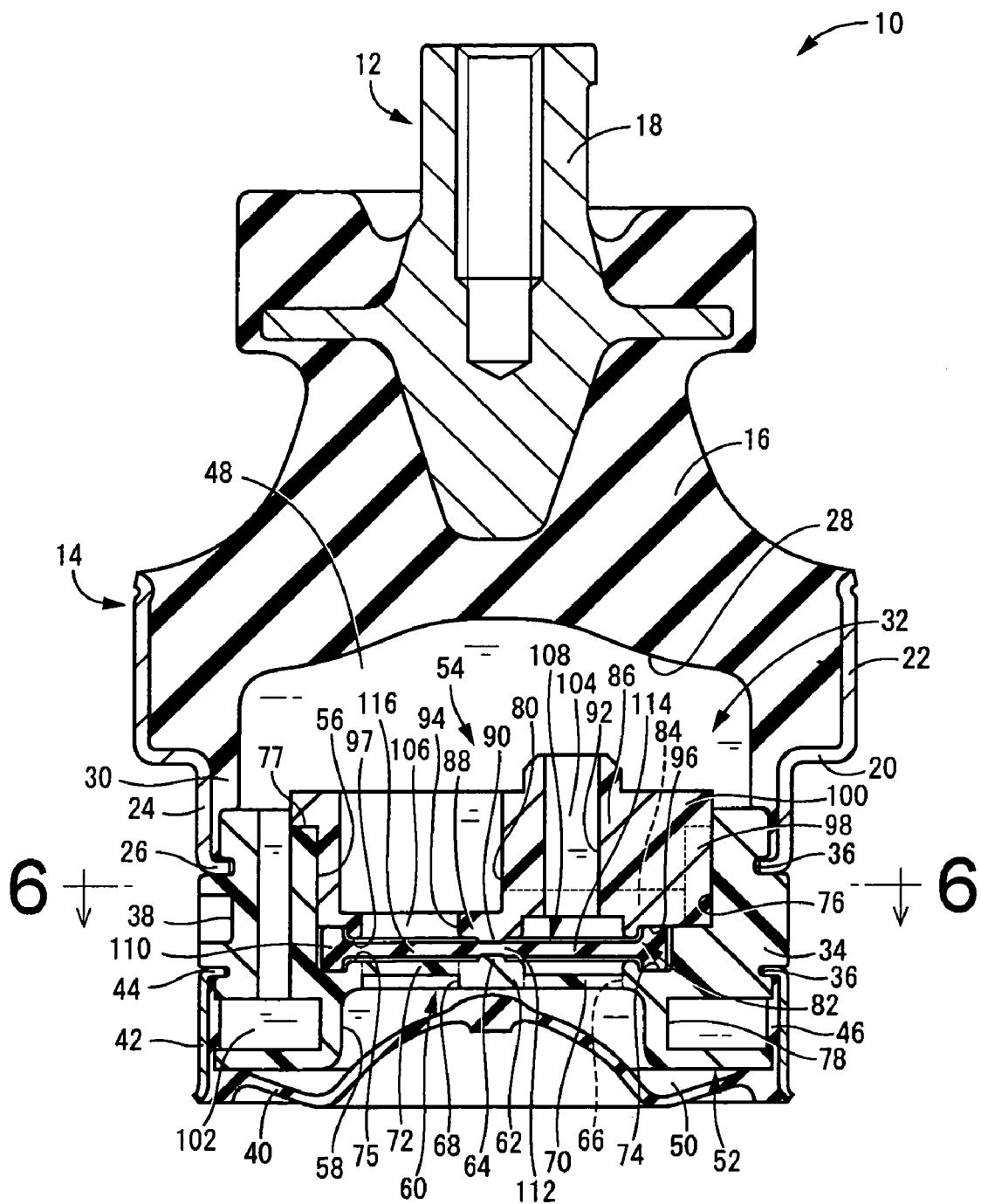
FIG. 1 is an elevational view in axial or vertical cross section of an automotive engine mount of construction according to one preferred embodiment of the invention.

First, an automobile engine mount 10 of construction according to an embodiment of the present invention is shown in FIG. 1. This engine mount 10 has a construction in which a metallic first mounting member 12 and a metallic second mounting member 14 are elastically coupled by a rubber elastic body 16. By mounting the first mounting member 12 to one member to be joined in a vibration-damping manner, namely an automobile power unit, and mounting the second mounting member 14 to the other member to be joined in a vibration-damping manner, namely an automobile body, the power unit is supported on the body in a vibration-damping manner. With this mounting configuration, the rubber elastic body 16 elastically deforms under the weight of the power unit, causing the first mounting member 12 and the second mounting member 14 to become displaced toward each other. Furthermore, with this mounting configuration, the main vibration to be damped are input in essentially the mounting axial direction, i.e., the direction of bringing the first mounting member 12 and the second mounting member 14 toward or away from each other (upward/downward in FIG. 1). In the description below, unless specified otherwise, the vertical (up/down) direction refers to the vertical (up/down) direction in FIG. 1, i.e., the mounting axial direction.

More specifically, the first mounting member 12 has a roughly inverted cone configuration. A mounting portion 18 that includes a screw hole that opens upward is integrally formed in the larger-diameter end of the first mounting member 12. The first mounting member 12 is secured to the power unit by fixing a bracket or other mounting member not shown that belongs to the power unit to the mounting portion 18 using a fastening bolt.

On the other hand, the second mounting member 14 comprises a cylindrical portion having an essentially cylindrical configuration with a large diameter over its entire length. One axial end thereof (the top end in FIG. 1) that is above a stepped area 20 formed in the axial center portion is deemed a large-diameter section 22, while the other axial end (the bottom end in FIG. 1) is deemed a small-diameter section 24. An engaging protrusion 26 that curves toward the diametric interior is integrally formed in a continuous annular configuration around the circumferential direction at the opening end of the small-diameter section 24. The second mounting member 14 can be effectively realized using a drawing process in which a blank metal piece is formed into a bottomed cylindrical body of prescribed axial length, followed by a pressing process in which the center area of the bottom is removed.

The second mounting member 14 is secured to the body by pressure-fitting the large-diameter section 22 into a cylindrical bracket piece not shown and mounting the bracket piece to the body. In addition, the first mounting member 12 is positioned substantially along the central axis of the second mounting member 14 with a gap between it and the top part of the large-diameter section 22, and the rubber elastic body 16 is disposed between the first mounting member 12 and the second mounting member 14.

The rubber elastic body 16 has an essentially inverted cone configuration, and a large-diameter recess 28 that opens in the center area thereof is formed in the large-diameter end surface thereof. In addition, the first mounting member 12 is vulcanization bonded to the small-diameter end area of the rubber elastic body 16 such that it is embedded therein in the axial direction, and the inner circumferential surface of the large-diameter section 22 of the second mounting member 14 is vulcanization bonded to the outer circumferential surface of the large-diameter end area of the rubber elastic body 16. As a result, the rubber elastic body 16 is formed as an integrally vulcanized unit that includes the first mounting member 12 and the second mounting member 14, while the rubber elastic body 16 provides a fluid-tight seal of the opening area of the large-diameter section 22 comprising one of the two openings of the second mounting member 14. Furthermore, a thin sealing rubber layer 30 integrally formed with the rubber elastic body 16 is deposited along the entire inner circumferential surface of the stepped area 20 and the small-diameter section 24 of the second mounting member 14.

A partition member 32 is disposed at the opening area of the small-diameter section 24 comprising the other opening area of the second mounting member 14. The partition member 32 has essentially a round block configuration, and is formed from a hard material such as metal or synthetic resin, for example (in this embodiment, a reinforced fiber resin such as polyphenylene sulfide (PPS) is used). Furthermore, a support protrusion 34 that extends continuously around the entire circumference and protrudes diametrically outward is integrally formed in the axial central portion of the partition member 32, and a pair of engaging grooves 36 are formed on either axial side of the support protrusion 34 such that it is sandwiched thereby. The engaging grooves 36 are disposed on the outer circumferential surface of the partition member 32 and extend continuously around the entire circumference thereof with an essentially uniform width. In addition, one or more holes 38 are disposed on the outer circumferential surface of the support protrusion 34 if necessary.

A diaphragm 40 that serves as a flexible layer is disposed at the bottom of the partition member 32. The diaphragm 40 comprises a thin rubber membrane with the configuration of a curved disk. Furthermore, a securing piece 42 having an essentially round, large-diameter cylindrical configuration is attached via vulcanization to the outer circumferential edge of the diaphragm 40, such that the diaphragm 40 comprises a single integrated vulcanized component part including the securing piece 42. Moreover, an annular engaging protrusion 44 that extends in a curved fashion toward the diametric center and runs continuously around the circumference is integrally formed at the top end of the securing piece 42. In addition, a thin sealing rubber layer 46 that is integrally formed with the diaphragm 40 is deposited along the entirety of the inner circumferential surface of the securing piece 42 including the engaging protrusion 44.

The small-diameter section 24 of the second mounting member 14 is engaged with the partition member 32 from above such that it is disposed outside the partition member 32, and the engaging protrusion 26 of the small-diameter section 24 comes into contact with one axial end surface (the top end in FIG. 1) of the support protrusion 34 while being secured via engagement with one of the engaging grooves 36 that sandwich the support protrusion 34 through diameter reduction processing of the second mounting member 14. Moreover, the sealing rubber layer 30 deposited on the inner circumferential surface of the second mounting member 14 is maintained in place via grasping pressure from the second mounting member 14 and the partition member 32. As a result, the opening area of the small-diameter section 24 of the second mounting member 14 is sealed with a fluid-tight seal.

The securing piece 42 is engaged with the partition member 32 from below such that it is disposed outside the partition member 32, and the engaging protrusion 44 of the securing piece 42 comes into contact with the end surface of the other axial end (the bottom end in FIG. 1) of the support protrusion 34 while being secured via engagement with the other of the engaging grooves 36 that sandwich the support protrusion 34 through diameter reduction processing of the securing piece 42. Moreover, a sealing rubber layer 46 deposited onto the inner circumferential surface of the securing piece 42 is maintained in place by being grasped by the securing piece 42 and the partition member 32. As a result, the top opening of the securing piece 42 is sealed with a fluid-tight seal. In other words, the opening area of the small-diameter section 24 of the second mounting member 14 is provided a fluid-tight seal by the diaphragm 40 via the partition member 32. Whether or not the diameter-reduction processing of the second mounting member 14 and the diameter-reduction processing of the securing piece 42 are carried out separately or simultaneously is determined in accordance with the manufacturing parameters and other factors.

Consequently, a pressure-receiving chamber 48, a part of the wall of which includes the recess 28 of the rubber elastic body 16, and which receives vibration based on the elastic deformation of the rubber elastic body 16, is formed above the partition member 32, while an equilibrium chamber 50, a part of the wall of which includes the diaphragm 40, and the volume of which can easily change based on the elastic deformation of the diaphragm 40, is formed below the partition member 32. A non-compressible fluid is sealed within the pressure-receiving chamber 48 and the equilibrium chamber 50. This fluid may comprise water, alkylene glycol, polyalkylene glycol, silicone oil or the like, but in order to effectively obtain the desired damping effect based on fluid action, such as the fluid resonance effect in particular, a low-viscosity fluid having a viscosity not exceeding 0.1 Pa·s is preferred. The filling of the non-compressible fluid is accomplished by assembling the vulcanized unit including the partition member 32 and securing piece 42 to the rubber elastic body 16 vulcanized unit including the first and second mounting members 12, 14 while the diaphragm 40 and the rubber elastic body 16 vulcanized unit are immersed in the selected non-compressible fluid.

Accordingly, the partition member 32 of this embodiment includes an outer orifice member 52 that serves as a first orifice member and an inner orifice member 54 that serves as a second orifice member.

Figure 2:
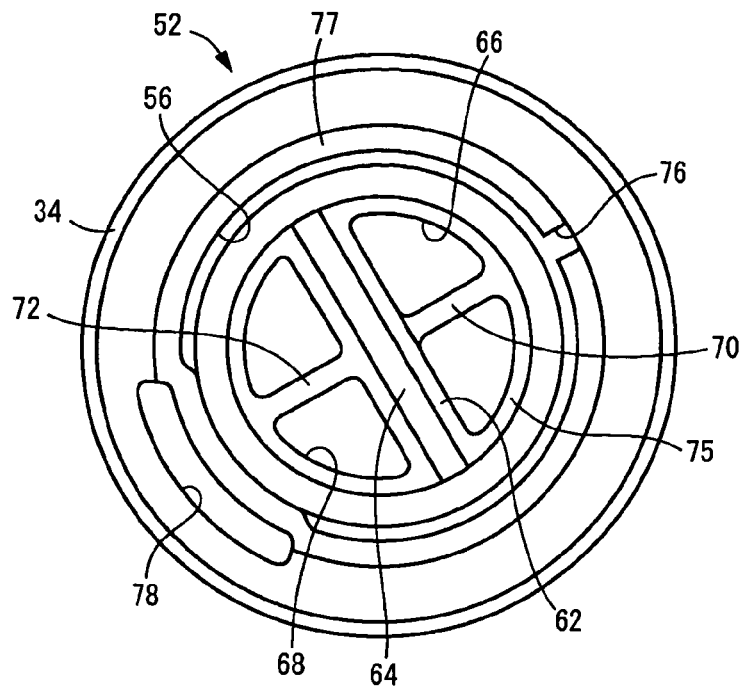
FIG. 2 is a top plane view of an outer orifice member of the engine mount of FIG. 1.
Figure 3:
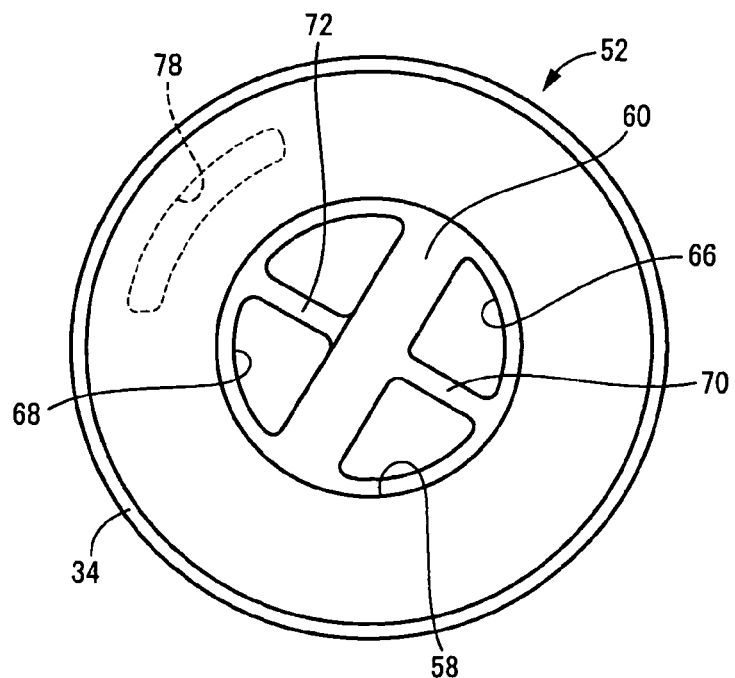
FIG. 3 is a bottom plane view of the outer orifice member of FIG. 2.

The outer orifice member 52 is configured essentially as a round block with a large diameter, as shown in FIGS. 2 and 3. A center concavity 56 that has a round plane configuration with a large diameter and opens upward is formed in the center of the outer orifice member 52. In addition, a downward-facing bottom concavity 58 that is disposed on the opposite side of the center concavity 56 and is shallower than the center concavity 56 is formed in the center of the outer orifice member 52. As a result, the bottom wall 60 of the center concavity 56 has essentially the configuration of a thin round disk.

A long plate-shaped center diameter section 62 is formed in the center of the bottom wall 60 of the center concavity 56 such that it extends diametrically. A protrusion 64 that protrudes upward is integrally formed with the center diameter section 62. The protrusion 64 runs essentially lengthwise along the center diameter section 62 and has a smaller width than the center diameter section 62. As a result, the central part of the bottom wall 60 of the center concavity 56 has an essentially constant protruding cross-section that extends diametrically.

A first through-hole 66 and a second through-hole 68 are respectively formed in semicircular regions disposed on either side of the center diameter section 62 of the bottom wall 60 (at the right and left sides in FIG. 1). The first and second through-holes 66 and 68 comprise roughly semicircular areas that are slightly smaller than the above semicircular regions and are positioned on either side of the center diameter section 62 with a gap therebetween along the widthwise direction.

A first reinforcing bar 70 is integrally formed over the first through-hole 66 disposed at one widthwise side of the bottom wall 60 of the center concavity 56 (the right side in FIG. 1). The first reinforcing bar 70 has an essentially long rectangular flat plate configuration, and extends diametrically while essentially bisecting the through-hole 66. In this embodiment in particular, the first reinforcing bar 70 is formed in the area below the axial center of the first through-hole 66, and the bottom end surface of the first reinforcing bar 70 is flush with the bottom end surface of the bottom wall 60.

In addition, a second reinforcing bar 72 that serves as a reinforcing bar is integrally formed in the second through-hole 68 disposed at the other widthwise side of the bottom wall 60 of the center concavity 56 (the left side in FIG. 1). The second reinforcing bar 72 has an essentially long rectangular flat plate configuration similar to that of the first reinforcing bar 70 and extends diametrically such that it essentially bisects the second through-hole 68. In other words, the first and second reinforcing bars 70, 72 are disposed such that they extend along a line coterminous with the diameter of the bottom wall 60 (left to right in FIG. 1). In this embodiment in particular, the second reinforcing bar 72 is formed in an area above the axial center of the second through-hole 68, and the top end surface of the second reinforcing bar 72 is flush with the top end surface of the bottom wall 60.

An engaging groove 74 is formed in the outer circumferential edge of the bottom wall 60 of the center concavity 56. The engaging groove 74 extends continuously along the circumferential direction and forms an essentially constant concave cross-section that opens upward. In this embodiment, the engaging groove 74 is positioned at a prescribed distance from the outer perimeters of the first and second through-holes 66, 68 such that it surrounds them over their entire perimeters, and as a result, the area between the outer perimeter edges of the first and second through-holes 66, 68 and the engaging groove 74 forms a stepped locking surface 75 that runs along the entire circumferential direction.

Furthermore, a locking groove 76 that extends in an approximately rectangular fashion in the axial direction (vertically in FIG. 1) is formed to a prescribed depth at one location of the circumferential wall of the center concavity 56.

Additionally, an annular right-angled section 77 that runs continuously along the entire perimeter of the center concavity 56 is formed on the circumferential edge of the opening of the center concavity 56.

A circumferential groove 78 is formed at the bottom axial end of the outer perimeter of the outer orifice member 52. The circumferential groove 78 has a roughly concave cross-sectional configuration that opens outward diametrically and extends for a prescribed length along such perimeter (for example, half of the circumferential length). One end of the circumferential groove 78 extends axially on the perimeter that is located diametrically outside the center concavity 56 of the outer orifice member 52 and opens to an axial end (the top in FIG. 1) surface thereof. In addition, the other end of the circumferential groove 78 opens on the circumferential wall surface of the bottom concavity 58 at the other axial end of the outer orifice member 52 or the bottom axial end surface thereof (i.e., the bottom in FIG. 1).

Figure 4:
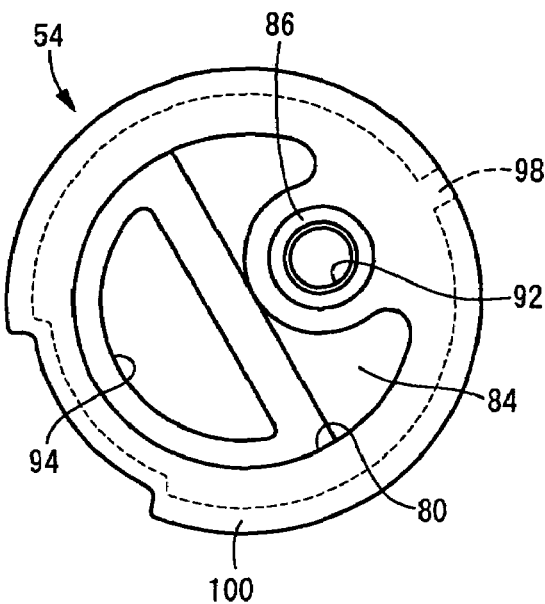
FIG. 4 is a top plane view of an inner orifice member of the engine mount of FIG. 1.
Figure 5:
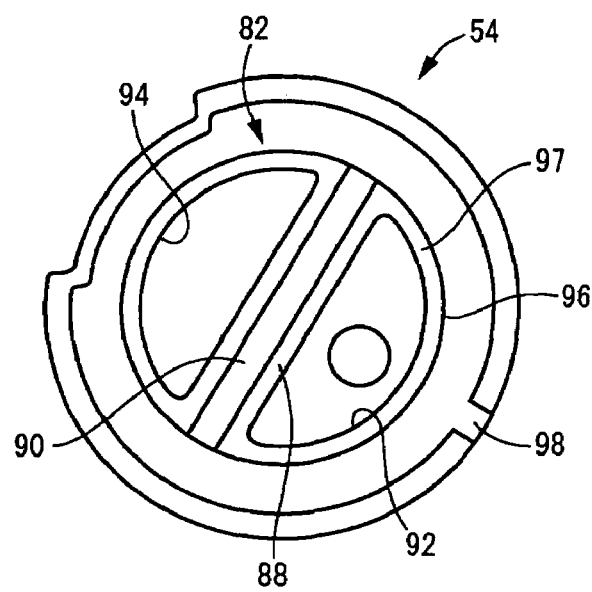
FIG. 5 is a bottom plane view of the inner orifice member of FIG. 4.

On the other hand, the inner orifice member 54 has an essentially circular block configuration, as shown in FIGS. 4 and 5. A recess 80 having an essentially round plane configuration is disposed in the center portion of the inner orifice member 54 such that it opens upward.

An elevated section 84 is integrally formed in one of the two roughly semicircular regions in the bottom wall 82 of the recess 80 (the right-hand region in FIG. 1 along the widthwise direction), and as a result, with regard to the height of the bottom wall 82, one of the semicircular regions of the bottom wall 82 that includes the elevated section 84 is higher than the other semicircular region (the left-hand region in FIG. 1).

An extension protrusion 86 is integrally formed in roughly the center of the elevated section 84 of the recess 80. The extension protrusion 86 has a roughly cylindrical configuration, and part of the circumferential wall thereof is integrally formed such that it comes into contact with part of the circumferential wall of the recess 80, while also being integrally formed such that it extends upward at a right angle from the top end surface of the elevated section 84. Furthermore, the top (surface) of the extension protrusion 86 is essentially flush with the opening end (surface) of the recess 80, and the proximal end of this top has a roughly semispherical configuration and protrudes further upward from the opening end of the recess 80.

A roughly longitudinal plate-shaped center diameter section 88 is formed in the area between the semicircular region that includes the elevated section 84 on the bottom wall 82 in the recess 80 and the semicircular region that does not include the elevated section 84, such that it extends along the border between the two regions. In addition, a protrusion 90 is integrally formed on the center diameter section 88 such that it protrudes downward from the bottom surface of the bottom wall 82 (that is, from the center diameter section 88). In this embodiment in particular, the center diameter section 88 and the protrusion 90 have essentially the same size and configuration as the center diameter section 62 and the protrusion 64 formed on the outer orifice member 52.

A first through-passage 92 passes through the semicircular region of the bottom wall 82 of the recess 80 that includes the elevated section 84. This first through-passage 92 is divided into two sections along the axial direction. The axial lower portion of the first through-passage 92 has a roughly semicircular configuration that is slightly smaller than that of the elevated section 84 and opens downward at the bottom wall 82 located below the elevated section 84. At the same time, the axial upper portion of the first through-passage 92 extends with an essentially constant circular cross-sectional configuration such that it travels in the axial direction through the center of the extension protrusion 86 located above the elevated section 84 and opens upward at the proximal end of the extension protrusion 86. In other words, the first through-passage 92 opens downward in the wide semicircular region of the bottom wall 82 at the axial lower end thereof, and opens upward with a small-diameter circular cross-section having a narrow opening at the axial upper end thereof.

A second through-passage 94 travels through the semicircular region that does not include the elevated section 84 on the bottom wall 82 in the recess 80. The second through-passage 94 has a roughly semicircular configuration slightly smaller than this semicircular region, and is positioned with a gap between it and the first through-passage 92 in the widthwise direction such that the two through-passages 92, 94 are formed on either side of the center diameter section 62. As a result, the second through-passage 94 opens downward in the wide semicircular region of the bottom wall 82 and opens upward through the recess 80.

An engaging groove 96 that opens downward is formed in the outer circumferential edge of the bottom wall 82 of the recess 80 so as to run continuously around the entire circumference. In this embodiment, because the engaging groove 96 is positioned on the outer perimeters of the first and second through-passages 92, 94 with a prescribed gap therebetween such that the first and second through-passages 92, 94 are completely surrounded by the engaging groove 96, the area between the first and second through-passages 92, 94 and the engaging groove 96 comprises a stepped locking surface 97 that runs along the entire circumference.

A locking protrusion 98 that faces diametrically outward is integrally formed at one location of the circumferential wall of the inner orifice member 54. The locking protrusion 98 has a roughly rectangular block configuration and runs in the axial direction between the top and bottom end surfaces of the inner orifice member 54.

Furthermore, a roughly annular flange 100 that extends from the inner orifice member 54 diametrically outward is formed on the top end of the inner orifice member 54.

The inner orifice member 54 is secured fitting into the center concavity 56 of the outer orifice member 52, by press-fitting or the like. The axial direction engaging end of the inner orifice member 54 that engages with the outer orifice member 52 is regulated by the engagement of the flange 100 of the inner orifice member 54 with the right-angled section 77 of the center concavity 56. As a result, the bottom end surface of the bottom wall 82 of the inner orifice member 54 and the bottom wall 60 of the outer orifice member 52, and by extension the protrusions 64, 90 and engaging grooves 74, 96 of the outer and inner orifice members 52, 54, as well as the first through-hole 66 and first through-passage 92, and the second through-hole 68 and second through-passage 94, become positioned facing each other with a prescribed gap therebetween in the axial direction.

The engagement and locking of the locking protrusion 98 of the inner orifice member 54 with the locking groove 76 fixes the positions of the outer orifice member 52 and inner orifice member 54 along the circumferential direction, and prevents them from rotating relative to each other around the central axes thereof. As a result, the first through-hole 66 formed in the outer orifice member 52 and the first through-passage 92 formed in the inner orifice member 54 are positioned such that they are projected onto each other in the axial direction as if stacked one on top of the other, and the second through-hole 68 formed in the outer orifice member 52 and the second through-passage 94 formed in the inner orifice member 54 are positioned such that they are projected onto each other in the axial direction as if stacked one on top of the other. In addition, the center diameter section 62 and protrusion 64 formed in the outer orifice member 52 and of the center diameter section 88 and protrusion 90 formed in the inner orifice member 54 become aligned such that they run in basically the same diametric direction. As is clear from these facts, in this embodiment, the positioning mechanism that positions the outer orifice member 52 and the inner orifice member 54 relative to each other in the circumferential direction includes the locking groove 76 and the locking protrusion 98.

The circumferential groove 78 of the outer orifice member 52 is sealed with a fluid-tight seal by the securing piece 42 and the like, with the sealing rubber layer sandwiched therebetween. Furthermore, one of the ends of the circumferential groove 78 is connected to the pressure-receiving chamber 48 via the through-hole formed in the top end surface of the outer orifice member 52, while the other end of the circumferential groove 78 is connected to the equilibrium chamber 50 via the through-hole formed in the bottom end surface of the outer orifice member 52 or the wall of the bottom concavity 58. As a result, a low-frequency orifice passage 102 that extends circumferentially for a prescribed length is formed, and the pressure-receiving chamber 48 and the equilibrium chamber 50 are connected to each other via this low-frequency orifice passage 102.

Fluctuations in the relative pressure of the pressure-receiving chamber 48 and the equilibrium chamber 50 occur based on the input of vibration between the first and second mounting members 12, 14, and fluid flow occurs between these two chambers 48, 50 through the low-frequency orifice passage 102. As a result of the fluid flow that occurs through the low-frequency orifice passage 102 between the pressure-receiving chamber 48 and the equilibrium chamber 50, damping action based on resonance or other flow action of the fluid traveling in the low-frequency orifice passage 102 occur with regard to the main direction to be subject to damping (in this embodiment, the direction of mounting). In this embodiment in particular, the resonance frequency of the fluid flowing in the low-frequency orifice passage 102 is tuned such that effective damping will take place based on fluid resonance with respect to low-frequency, high-amplitude vibration of around 10 Hz that typically occurs with engine shake. This resonance frequency tuning is performed by changing the parameters governing the low-frequency orifice passage 102, such as the flow path's cross-sectional area and length.

Furthermore, the first through-passage 92 of the inner orifice member 54 links to the pressure-receiving chamber 48 and also connects to the equilibrium chamber 50 via the first through-hole 66 of the outer orifice member 52. In this embodiment, a middle-frequency orifice passage 104, by which damping action is obtained based on essentially the same principle as the damping effect based on fluid flow through the low-frequency orifice passage 102 described above, comprises this first through-passage 92. In this embodiment in particular, the resonance frequency of the fluid flowing in the middle-frequency orifice passage 104 is tuned such that effective damping will take place based on fluid resonance with respect to the middle-frequency, moderate-amplitude vibrations of around 15-30 Hz that typically occur during engine idling.

Furthermore, the second through-passage 94 of the inner orifice member 54 connects to the pressure-receiving chamber 48 via the recess 80 and communicates with the equilibrium chamber 50 via the second through-hole 68 of the outer orifice member 52. In this embodiment, a high-frequency orifice passage 106, by which damping action is obtained based on essentially the same principle as damping action based on fluid flow through the low-frequency orifice passage 102 described above, comprises this second through-passage 94. In this embodiment in particular, the resonance frequency of the fluid flowing in the high-frequency orifice passage 106 is tuned such that effective damping will take place based on fluid resonance with respect to high-frequency, low-amplitude vibrations of around 80-120 Hz such as rumble during driving. As is clear from the above discussion, part of the pressure-receiving chamber 48 comprises the recess 80.

Figure 6:
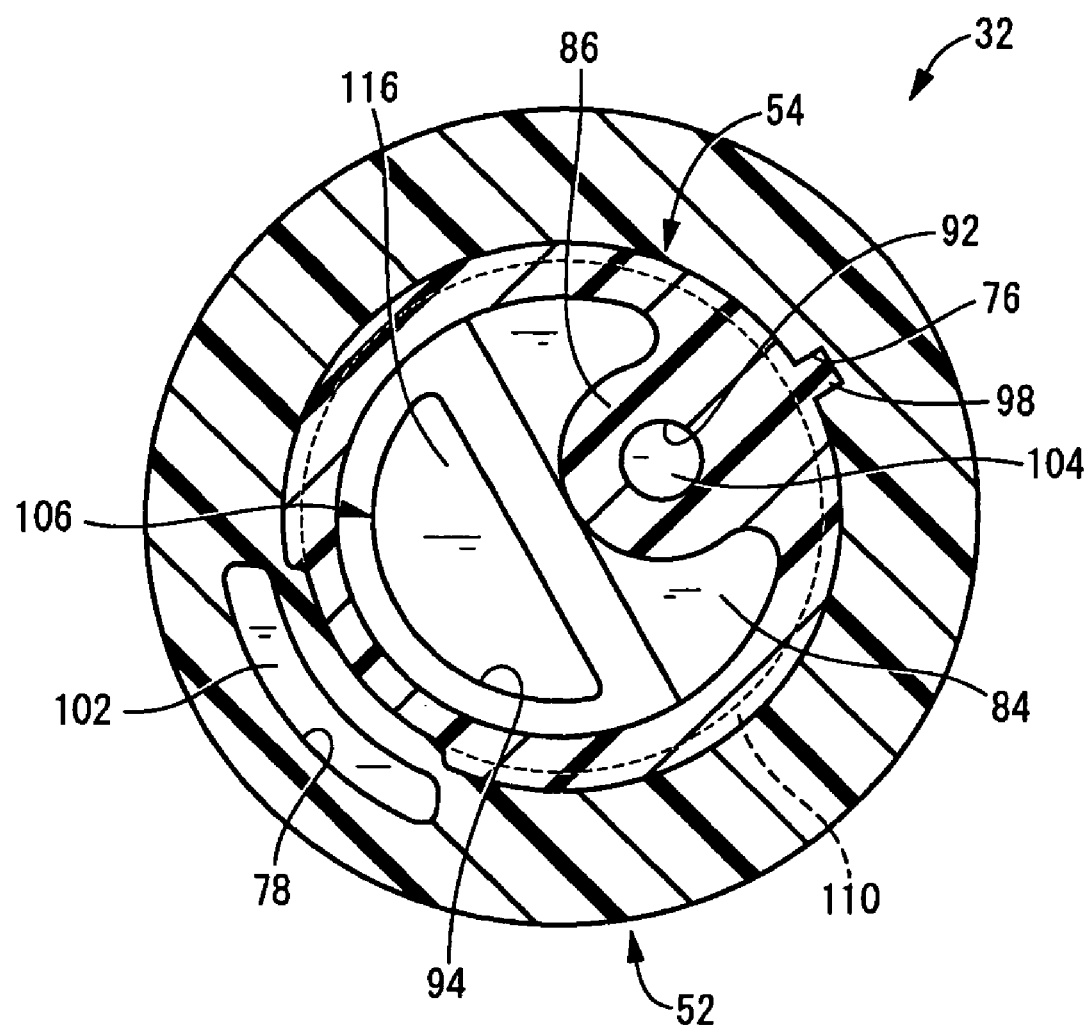
FIG. 6 is a cross sectional view taken along line 6-6 of FIG. 1.

As shown in FIG. 6, a deformable rubber membrane 108 that operates as a rubber partition plate is disposed in the gap between the bottom wall 60 of the outer orifice member 52 and the bottom wall 82 of the inner orifice member 54. The deformable rubber membrane 108 is formed from a rubber elastic member and has essentially a thin disk configuration with a uniform thickness. In particular, the thickness of the deformable rubber membrane 108 is larger than the size of the gap between the two opposing surfaces of (i) the protrusion 64 of the outer orifice member 52 and (ii) the protrusion 90 of the inner orifice member 54, but is smaller than the size of the gap between the two opposing surfaces of (i) the locking surface 75 of the outer orifice member 52 and (ii) the locking surface 97 of the inner orifice member 54.

An annular seal unit 110 is formed on the outer circumferential edge of the deformable rubber membrane 108. The annular seal unit 110 runs continuously along the entire circumference of the deformable rubber membrane 108 and protrudes toward either side thereof in terms of its thickness (i.e., upward and downward in FIG. 1). The axial thickness of the annular seal unit 110 is larger than the gap between the opposing surfaces of (i) the engaging groove 74 of the outer orifice member 52 and (ii) the engaging groove 96 of the inner orifice member 54.

The deformable rubber membrane 108 is grasped between the top surface of the bottom wall 60 of the outer orifice member 52 and the bottom surface of the bottom wall 82 of the inner orifice member 54 when the inner orifice member 54 and the outer orifice member 52 engage with each other. A center diameter section 112 that extends diametrically through the center axis of the deformable rubber membrane 108 is held via grasping pressure between the protrusion 64 formed in the center diameter section 62 of the outer orifice member 52 and the protrusion 90 formed in the center diameter section 88 of the inner orifice member 54 to form a fluid-tight seal. This grasping pressure can be adjusted by adjusting the gap between the opposing surfaces of the protrusions 64, 90, the thickness of the deformable rubber membrane 108 and the like.

The annular seal unit 110 of the deformable rubber membrane 108 is positioned between the engaging groove 74 of the outer orifice member 52 and the engaging groove 96 of the inner orifice member 54, and is held with a fluid-tight seal by the two engaging grooves 74, 96 jointly via grasping pressure. This grasping pressure can be adjusted by adjusting the gap between the opposing surfaces of the engaging grooves 74, 96, the axial size of the deformable rubber membrane 108, and the like. In addition, displacement of the annular seal unit 110 toward its inner circumferential side is prevented by the locking of the inner circumferential surface of the annular seal unit 110 with the stepped locking surface 75 of the outer orifice member 52 and the stepped locking surface 97 of the inner orifice member 54.

As will be understood from the above description, in this embodiment, the grasping mechanism that holds the center diameter section 112 of the deformable rubber membrane 108 includes the protrusions 64, 90 and the grasping mechanism that holds the outer circumferential edge of the deformable rubber membrane 108 includes the engaging grooves 74, 96 and the annular seal unit 110. Furthermore, the seal mechanism that holds the center diameter section 112 and the outer circumferential edge of the deformable rubber membrane 108 with a fluid-tight seal includes the above two grasping mechanisms.

As a result, a first deformable membrane section 114 is formed by the roughly semicircular region surrounded by one of the circumferential halves of the annular seal unit 110 (the right-hand half in FIG. 1) and the center diameter section 112, and is disposed in an elastically deformable fashion between the bottom wall 60 of the outer orifice member 52 and the bottom wall 82 of the inner orifice member 54. A second deformable membrane section 116 is formed by the roughly semicircular region surrounded by the other of the circumferential halves of the annular seal unit 110 (the left-hand half in FIG. 1) and the center diameter section 112, and is disposed in an elastically deformable fashion between the bottom wall 60 of the outer orifice member 52 and the bottom wall 82 of the inner orifice member 54. In other words, in this embodiment, the first and second deformable membrane sections 114, 116 have symmetrical semicircular configurations and form mirror images of each other on either side of the center diameter section 112 of the deformable rubber membrane 108.

The two surfaces of the first deformable membrane section 114 respectively face the first through-hole 66 and the first through-passage 92, and the first deformable membrane section 114 is held via grasping pressure between the first through-hole 66 and the first through-passage 92 by the outer orifice member 52 and the inner orifice member 54 with a fluid-tight seal. As a result, the flow of fluid through the middle-frequency orifice passage 104 between the pressure-receiving chamber 48 and the equilibrium chamber 50 takes place as a practical matter based on the elastic deformation of the first deformable membrane section 114.

The two surfaces of the second deformable membrane section 116 respectively face the second through-hole 68 and the second through-passage 94, and the second deformable membrane section 116 is held via grasping pressure between the second through-hole 68 and the second through-passage 94 by the outer orifice member 52 and the inner orifice member 54 with a fluid-tight seal. As a result, the flow of fluid through the high-frequency orifice passage 106 between the pressure-receiving chamber 48 and the equilibrium chamber 50 takes place as a practical matter based on the elastic deformation of the second deformable membrane section 116.

As will be apparent from the above description, the first flow restricting assembly disposed in the fluid flow path created by the middle-frequency orifice passage 104 comprises the first deformable membrane section 114, and the second flow restricting assembly disposed in the fluid flow path created by the high-frequency orifice passage 106 comprises the second deformable membrane section 116.

The first and second reinforcing bars 70 and 72 are respectively formed in the center portions of the first and second deformable membrane sections 114 and 116, and each is positioned with a gap between it and its corresponding membrane section in the axial direction. Furthermore the gap between the second deformable membrane section 116 and the second reinforcing bar 72 is smaller than the gap between the first deformable membrane section 114 and the first reinforcing bar 70. As a result, the free length of the second deformable membrane section 116 is limited significantly in comparison with the free length of the first deformable membrane section 114, and consequently the second deformable membrane section 116 is more rigid than the first deformable membrane section 114. As a result, the characteristic vibration frequency of the second deformable membrane section 116 is set to a higher frequency range than the characteristic vibration frequency of the first deformable membrane section 114. As will be apparent from the description above, the rigidity adjustment member includes the first and second reinforcing bars 70, 72 formed in the outer orifice member 52.

In this embodiment in particular, the characteristic vibration frequency of the first deformable membrane section 114 is tuned such that effective damping will occur with respect to the middle-frequency, medium-amplitude vibration in the 15-30 Hz range that typically occur during engine idling, for example, based on the deformation or displacement of the membrane section 114. Furthermore, the characteristic vibration frequency of the second deformable membrane section 116 is tuned such that effective damping will occur with respect to the high-frequency, low-amplitude vibration in the 80-120 Hz range comprising the booming noises of driving, for example, based on the deformation or displacement of the membrane section 116. The amount of elastic deformation of the deformable membrane sections 114 and 116 is restricted by the elasticity of the sections themselves as well as by contact with the central reinforcing bars 70, 72. As a result, when low-frequency, high-amplitude vibrations are input, the fluid pressure absorption that accompanies the elastic deformation or the like of the deformable membrane sections 114, 116 is minimized, and a sufficient amount of fluid flow through the low-frequency orifice passage 102 can be obtained.

In an automobile engine mount 10 having the above construction, when vibration in the low-frequency range characteristic of engine shake, for example, is input, it is difficult for the large fluctuations in pressure that occur in the pressure-receiving chamber 48 to be absorbed via elastic deformation of either the first deformable membrane section 114 or the second deformable membrane section 116, and fluid flow through the middle-frequency orifice passage 104 and the high-frequency orifice passage 106 is restricted based on the prevention of this deformation. As a result, a sufficient amount of fluid flow between the pressure-receiving chamber 48 and the equilibrium chamber 50 through the low-frequency orifice passage 102 is obtained based on the pressure fluctuations in the pressure-receiving chamber 48, and damping of low-frequency vibration such as engine shake is effectively carried out via fluid flow action, such as resonance of the fluid flowing in the low-frequency orifice passage 102.

When vibration in the middle-frequency range typical of engine idling, for example, is input, while the low-frequency orifice passage 102 is substantially sealed based on the resonance phenomenon therein, the high-powered spring effect accompanying this increase in pressure in the pressure-receiving chamber 48 is mitigated due to elastic deformation of the first deformable membrane section 114. Accordingly, in this embodiment, because the characteristic vibration frequency of the first deformable membrane section 114 is tuned to the middle-frequency range characteristic of engine idling vibration, resonance occurs in the first deformable membrane section 114 when vibration in this frequency range is input, causing elastic deformation of the first deformable membrane section 114. Furthermore, the pressure fluctuations occurring in the pressure-receiving chamber 48 as a result of this vibration input are difficult for the second deformable membrane section 116 to absorb through elastic deformation, since the second deformable membrane section 116 is configured to be more rigid than the first deformable membrane section 114. As a result, the amount of fluid flowing through the middle-frequency orifice passage 104 is obtained at a sufficient level. Consequently, a damping effect is effectively obtained from this fluid flow effect that includes the resonance of the fluid flowing in the middle-frequency orifice passage 104. In addition, the pressure-receiving chamber 48 is able to absorb pressure fluctuations due to the change in storage capacity thereof attributable to the elastic deformation of the first deformable membrane section 114.

Where vibration in the high-frequency range characteristic of the booming noises of driving is input, for example, while the middle-frequency orifice passage 104 also becomes effectively sealed off, the high-powered spring effect that would ordinarily result from the high pressure in the pressure-receiving chamber 48 is mitigated by the elastic deformation of the second deformable membrane section 116. Accordingly, in this embodiment, since the natural frequency of the second deformable membrane section 116 is tuned to the high frequency range characteristic of driving rumble, resonance occurs in the second deformable membrane section 116 when vibration in this frequency range is input, causing elastic deformation of the second deformable membrane section 116. As a result, a sufficient amount of fluid flow through the high-frequency orifice passage 106 is obtained. Moreover, damping action is effectively obtained from this fluid flow action including resonance of the fluid flowing in the high-frequency orifice passage 106. In addition, the pressure-receiving chamber 48 is able to absorb pressure fluctuations due to the change in storage capacity thereof attributable to the elastic deformation of the second deformable membrane section 116.

As described above, in the engine mount 10 of this embodiment, because the high-powered spring effect that would ordinarily result from the high pressure in the pressure-receiving chamber 48 due to the effective sealing off of the low- and middle-frequency orifice passages 102, 104 is avoided, good damping performance can be obtained for multiple frequencies across a wide range.

The first deformable membrane section 114 comprising a first flow restricting assembly for the middle-frequency orifice passage 104 and the second deformable membrane section 116 comprising a second flow restricting assembly for the high-frequency orifice passage 106 together comprise a single deformable rubber membrane 108 disposed between the outer orifice member 52 and the inner orifice member 54. As a result, the number of component parts pertaining to the flow restricting assembly is effectively reduced, the construction is simplified, and manufacturing and assembly can be carried out efficiently and at relatively low cost.

Combining the first deformable membrane section 114 and the second deformable membrane section 116 into a single component makes the assembly process easier. Moreover, in this embodiment, assembly is made even easier by including a circumferential positioning mechanism for the outer orifice member 52 and the inner orifice member 54.

In this embodiment, because the characteristic vibration frequencies of the first deformable membrane section 114 and the second deformable membrane section 116 are adjusted via the first reinforcing bar 70 and the second reinforcing bar 72 disposed on the outer orifice member 52 and the inner orifice member 54, respectively, the direction of assembly of the deformable rubber membrane 108 comprising the first deformable membrane section 114 and the second deformable membrane section 116 need not be considered. Therefore, not only does assembly become even easier, but the assembly error of placing the first deformable membrane section 114 or the second deformable membrane section 116 in the wrong orifice passage during assembly is easily prevented.

Moreover, by using the engagement securing construction of the outer orifice member 52 and inner orifice member 54 as well as the elasticity of the deformable rubber membrane 108, the first deformable membrane section 114 and second deformable membrane section 116 easily constitute first and second flow restricting assembly that include a highly effective fluid-tight seal.

In addition, since the low-frequency orifice passage 102 is formed at the outer perimeter of the outer orifice member 52 and directly connects the pressure-receiving chamber 48 to the equilibrium chamber 50, the occurrence of pressure leaks through gaps formed in the connections of component parts can be effectively avoided.

Therefore, the engine mount 10 of this embodiment affords significant technological benefits, in that not only can the desired damping effect be obtained for multiple frequencies across a wide frequency range in a stable fashion, but this effect can be realized with a relatively simple construction and manufacturing can be carried out efficiently and at low cost.

While the present invention was described above based on an embodiment, the embodiment is merely exemplary. The present invention is not limited to the specific description of the embodiment, and various amendments, modifications or improvements will be apparent to the practitioner skilled in the art. In addition, other embodiments are naturally included so long as they fall within the essential scope of the present invention.

For example, while rigidity adjustment of the first deformable membrane section 114 and the second deformable membrane section 116 in the above embodiment was realized using a first reinforcing bar 70 and second reinforcing bar 72 disposed in the outer orifice member 52 and inner orifice member 54, respectively, it may alternatively be realized by using different sizes, constructions or the like for the first deformable membrane section 114 and the second deformable membrane section 116.

Furthermore, while the sections respectively comprising the first deformable membrane section 114 and the second deformable membrane section 116 of the deformable rubber membrane 108 had symmetrical, roughly semicircular configurations, asymmetrical semicircular configurations may be used in accordance with the desired damping characteristics. Moreover, the first deformable membrane section 114 and second deformable membrane section 116 are not limited to the symmetrical, roughly semicircular configurations as described above, and asymmetrical semicircular or circular configurations may be used by giving the membrane sections different configurations or thicknesses or by changing the configuration or size of the seal mechanism disposed in the partition member 32.

In addition, the design configurations, sizes and constructions of the outer orifice member 52, inner orifice member 54, low-frequency orifice passage 102, middle-frequency orifice passage 104, high-frequency orifice passage 106, deformable rubber membrane 108 and other components may be changed in accordance with the desired damping characteristics of the mount 10, and are not limited to the configurations, sizes and constructions described with reference to the example described above.

In the above embodiment, the present invention was applied to an automobile engine mount, but the present invention is naturally not limited to this implementation, and may be applied to an automobile body mount or to various types of damping devices used in machinery or equipment other than automobiles.

What is claimed is:

1. A fluid filled vibration damping device comprising:
a first mounting member attachable to one of two members coupled together in a vibration damping manner;
a second mounting member attachable to an other of the two members and having a cylindrical portion one opening of which is axially opposed to the first mounting member with a gap therebetween;
a rubber elastic body elastically connecting the first and second mounting members so that the rubber elastic body closes off the one opening of the cylindrical portion of the second mounting member with a fluid-tight seal;
a flexible layer closing off an other opening of the cylindrical portion with a fluid-tight seal;
a partition member disposed within and rigidly supported by the cylindrical portion so that a pressure-receiving chamber having a non-compressible fluid sealed therein and partially defined by the rubber elastic body is formed on one side of the partition member, and an equilibrium chamber having the non-compressible fluid sealed therein and partially defined by the flexible layer is formed on an other side of the partition member; and
a low-frequency orifice passage interconnecting the pressure-receiving chamber and the equilibrium chamber,
wherein the partition member includes: a first orifice member disposed in a space between the rubber elastic body and the flexible layer and is rigidly supported by the cylindrical portion of the second mounting member at an outer edge thereof, and having a center concavity that opens toward the pressure-receiving chamber; and a second orifice member securely fitted into the center concavity of the first orifice member,
wherein the low-frequency orifice passage is formed so as to run circumferentially around an outer circumferential surface of the first orifice member, and ends of the low-frequency orifice passage open directly toward the pressure-receiving chamber and the equilibrium chamber at either axial end surface of the first orifice member,
wherein a rubber partition plate is disposed between a bottom wall of the center concavity of the first orifice member and a bottom end surface of the second orifice member to create a seal mechanism that grasps an outer perimeter edge and a center diameter section of the rubber partition plate with a fluid-tight seal between the bottom wall of the center concavity of the first orifice member and the bottom end surface of the second orifice member,
wherein semicircular sections of the rubber partition plate surrounded by areas grasped by the seal mechanism constitute a first deformable membrane section and a second deformable membrane section that respectively allow prescribed amounts of elastic deformation along a direction of thickness of the rubber partition plate, such that the first deformable membrane section comprises a first flow restricting assembly disposed in a fluid flow path in a middle-frequency orifice passage and the second deformable membrane section comprises a second flow restricting assembly disposed in a fluid flow path in a high-frequency orifice passage, and
wherein a first through-hole that links the first deformable membrane section to the equilibrium chamber and a second through-hole that links the second deformable membrane section to the equilibrium chamber are formed in the first orifice member, and a first through-passage that links the first deformable membrane section to the pressure-receiving chamber and a second through-passage that links the second deformable membrane section to the pressure-receiving chamber are formed in the second orifice member, such that the first through-passage constitutes the middle-frequency orifice passage tuned to a higher range of vibration than the low-frequency orifice passage and the second through-passage constitutes the high-frequency orifice passage tuned to a higher range of vibration than the middle-frequency orifice passage.

2. A fluid filled vibration damping device according to claim 1, wherein a recess that opens toward the pressure-receiving chamber is formed in the second orifice member so that the pressure-receiving chamber is partially defined by a concavity of the second orifice member, and the second through-passage is formed to pass through a bottom wall of the recess.

3. A fluid filled vibration damping device according to claim 1, wherein an extension protrusion that protrudes toward the pressure-receiving chamber is integrally formed in the second orifice member, and the first through-passage is formed so as to axially pass through an area in which the extension protrusion is formed.

4. A fluid filled vibration damping device according to claim 1, further comprising a positioning mechanism disposed between the first and second orifice members for fixing relative positions of the first and second orifice members in a circumferential direction by preventing a relative axial rotation thereof.

5. A fluid filled vibration damping device according to claim 1, wherein protrusions that protrude toward the center diameter section of the rubber partition plate are integrally formed with the bottom wall of the center concavity of the first orifice member and the bottom end surface of the second orifice member, respectively; and the seal mechanism includes a grasping mechanism that uses these protrusions to grasp this center diameter section.

6. A fluid filled vibration damping device according to claim 1, wherein the rubber partition plate includes an annular seal unit integrally formed at an outer rim thereof so as to protrude toward either side thereof, and so as to run continuously around a circumference thereof, and wherein the seal mechanism includes a grasping mechanism that grasps the seal unit in the direction of the thickness of the rubber partition plate via the bottom wall of the center concavity of the first orifice member and the bottom end surface of the second orifice member, and stepped locking surfaces that engage with an inner circumferential surface of the annular seal unit to prevent a displacement thereof toward an inner circumferential side thereof are respectively formed on the bottom wall of the center concavity of the first orifice member and the bottom end surface of the second orifice member.

7. A fluid filled vibration damping device according to claim 1, wherein the second orifice member includes a rigidity adjustment member; and a rigidity of the second deformable membrane section is increased to a degree higher than that of the first deformable membrane section.

8. A fluid filled vibration damping device according to claim 7, wherein the second through-hole includes at a circumferential center thereof a reinforcing bar that traverses the second through-hole so that the rigidity adjustment member is achieved by restricting the elastic deformation of the second deformable membrane section via contact with this reinforcing bar.

9. A fluid filled vibration damping device according to claim 1, wherein the second orifice member includes a flange that extends in an axis-perpendicular direction thereof, and the flange of the second orifice member contacts an edge of an opening of the center concavity of the first orifice member to define an insertion end of the second orifice member relative to the first orifice member in the axial direction.

10. A fluid filled vibration damping device according to claim 1, wherein a natural frequency of the first deformable membrane section is tuned to a vibration frequency range to be damped, which is higher than a resonance frequency of the fluid flowing through the low-frequency orifice passage, and a natural frequency of the second deformable membrane section is tuned to a vibration frequency range to be damped that is higher than a resonance frequency of the fluid flowing through the middle-frequency orifice passage.

11. An automobile engine mount utilizing a fluid filled vibration damping device comprising:
    a first mounting member attachable to one of two members coupled together in a vibration damping manner;
    a second mounting member attachable to an other of the two members and having a cylindrical portion one opening of which is axially opposed to the first mounting member with a gap therebetween;
    a rubber elastic body elastically connecting the first and second mounting members so that the rubber elastic body closes off the one opening of the cylindrical portion of the second mounting member with a fluid-tight seal;
    a flexible layer closing off an other opening of the cylindrical portion with a fluid-tight seal;
    a partition member disposed within and rigidly supported by the cylindrical portion so that a pressure-receiving chamber partially defined by the rubber elastic body is formed on one side of the partition member, and an equilibrium chamber partially defined by the flexible layer is formed on an other side of the partition member; and
    a low-frequency orifice passage interconnecting the pressure-receiving chamber and the equilibrium chamber,
    wherein the partition member includes: a first orifice member disposed in a space between the rubber elastic body and the flexible layer and is rigidly supported by the cylindrical portion of the second mounting member at an outer edge thereof, and having a center concavity that opens toward the pressure-receiving chamber; and a second orifice member securely fitted into the center concavity of the first orifice member,
    wherein the low-frequency orifice passage is formed so as to run circumferentially around an outer circumferential surface of the first orifice member; and ends of the low-frequency orifice passage open directly towards the pressure-receiving chamber and the equilibrium chamber at either axial end surface of the first orifice member,
    wherein a rubber partition plate is disposed between a bottom wall of the center concavity of the first orifice member and a bottom end surface of the second orifice member, to create a seal mechanism that grasps an outer perimeter edge and a center diameter section of the rubber partition plate with a fluid-tight seal between the bottom wall of the center concavity of the first orifice member and the bottom end surface of the second orifice member, wherein semicircular sections of the rubber partition plate surrounded by areas grasped by the seal mechanism constitute a first deformable membrane section and a second deformable membrane section that respectively allow prescribed amounts of elastic deformation along a direction of thickness of the rubber partition plate, such that the first deformable membrane section comprises a first flow restricting assembly disposed in a fluid flow path in a middle-frequency orifice passage and the second deformable membrane section comprises a second flow restricting assembly disposed in a fluid flow path in a high-frequency orifice passage, and wherein a first through-hole that links the first deformable membrane section to the equilibrium chamber and a second through-hole that links the second deformable membrane section to the equilibrium chamber are formed in the first orifice member, and a first through-passage that links the first deformable membrane section to the pressure-receiving chamber and a second through-passage that links the second deformable membrane section to the pressure-receiving chamber are formed in the second orifice member, such that the first through-passage constitutes the middle-frequency orifice passage tuned to a higher range of vibration than the low-frequency orifice passage and the second through-passage constitutes the high-frequency orifice passage tuned to a higher range of vibration than the middle-frequency orifice passage, and wherein by mounting either the first or the second mounting member to an automobile power unit and mounting an other of the first or the second mounting member to an automobile body, the power unit is supported on the body in a vibration-damping manner, a resonance frequency of the fluid flowing through the low-frequency orifice passage is tuned to a low vibration frequency range typical of engine shake, a resonance frequency of the fluid flowing through the middle-frequency orifice passage is tuned to a middle vibration frequency range characteristic of engine idling, and a resonance frequency of the fluid flowing through the high-frequency orifice passage is tuned to a high vibration frequency range characteristic of booming noise.

* * * * *